(12) United States Patent
Marupaduga

(10) Patent No.: US 12,426,011 B2
(45) Date of Patent: Sep. 23, 2025

(54) USE OF NOISE AS A BASIS TO CONTROL CONFIGURATION OF NARROWBAND CARRIER WITHIN WIDEBAND CARRIER

(71) Applicant: T-Mobile USA, Inc., Bellevue, WA (US)

(72) Inventor: Sreekar Marupaduga, Bellevue, WA (US)

(73) Assignee: Sprint Spectrum LLC, Bellevue, WA (US)

( * ) Notice: Subject to any disclaimer, the term of this patent is extended or adjusted under 35 U.S.C. 154(b) by 758 days.

(21) Appl. No.: 17/301,788

(22) Filed: Apr. 14, 2021

(65) Prior Publication Data

US 2022/0338171 A1 Oct. 20, 2022

(51) Int. Cl.
*H04W 72/02* (2009.01)
*H04W 72/0453* (2023.01)
*H04W 72/30* (2023.01)
*H04W 72/541* (2023.01)

(52) U.S. Cl.
CPC ....... *H04W 72/02* (2013.01); *H04W 72/0453* (2013.01); *H04W 72/30* (2023.01); *H04W 72/541* (2023.01)

(58) Field of Classification Search
CPC ... H04W 72/02; H04W 72/541; H04W 72/30; H04W 72/0453
See application file for complete search history.

(56) References Cited

U.S. PATENT DOCUMENTS

| | | | |
|---|---|---|---|
| 5,878,034 A * | 3/1999 | Hershey | H04J 3/0682 370/321 |
| 10,075,851 B1 | 9/2018 | Marupaduga et al. | |
| 10,660,095 B1 | 5/2020 | Marupaduga et al. | |
| 10,798,706 B1 | 10/2020 | Raghunathan et al. | |
| 10,798,719 B2 | 10/2020 | Beale et al. | |
| 2011/0053553 A1* | 3/2011 | Lambert | H04W 16/00 455/404.2 |
| 2013/0195023 A1* | 8/2013 | Vaisanen | H04B 17/26 370/329 |
| 2013/0295980 A1* | 11/2013 | Reuven | H04B 17/345 455/226.3 |

(Continued)

OTHER PUBLICATIONS

International Search Report and Written Opinion from International Application No. PCT/US22/22511, dated Jul. 7, 2022.

*Primary Examiner* — Rhonda L Murphy
(74) *Attorney, Agent, or Firm* — Lee & Hayes, P.C.

(57) ABSTRACT

A method and system to control configuration of a narrowband carrier within frequency bandwidth of a wideband carrier, where the frequency bandwidth of the wideband carrier defines a plurality of frequency segments. An example method includes selecting one of the frequency segments of the frequency bandwidth of the wideband carrier on which to define the narrowband carrier, with the selecting being based on the one frequency segment having a lowest level of noise among the plurality of frequency segments. And the example method may then further include, based on the selecting, configuring the narrowband carrier on the selected frequency segment of the frequency bandwidth of the wideband carrier rather than on another frequency segment of the plurality of frequency segments.

20 Claims, 4 Drawing Sheets

SELECT, FROM A PLURALITY OF FREQUENCY SEGMENTS OF THE FREQUENCY BANDWIDTH OF THE WIDEBAND CARRIER, ONE FREQUENCY SEGMENT ON WHICH TO DEFINE THE NARROWBAND CARRIER, WITH THE SELECTING BEING BASED ON THE ONE FREQUENCY SEGMENT HAVING A LOWEST LEVEL OF NOISE AMONG THE PLURALITY OF FREQUENCY SEGMENTS — 28

BASED ON THE SELECTING, CONFIGURE THE NARROWBAND CARRIER ON THE SELECTED FREQUENCY SEGMENT OF THE FREQUENCY BANDWIDTH OF THE WIDEBAND CARRIER RATHER THAN ON ANOTHER FREQUENCY SEGMENT OF THE PLURALITY OF FREQUENCY SEGMENTS — 30

(56) References Cited

U.S. PATENT DOCUMENTS

| | | |
|---|---|---|
| 2014/0241261 A1 | 8/2014 | Ratasuk et al. |
| 2016/0044642 A1 | 2/2016 | Xu et al. |
| 2016/0105803 A1 | 4/2016 | Sakhnini et al. |
| 2016/0316374 A1 | 10/2016 | Xu et al. |
| 2020/0120458 A1* | 4/2020 | Aldana ................ H04W 72/23 |
| 2022/0078798 A1* | 3/2022 | Kumar ................ H04W 72/542 |
| 2022/0167432 A1* | 5/2022 | Lee .................... H04W 72/0446 |

* cited by examiner

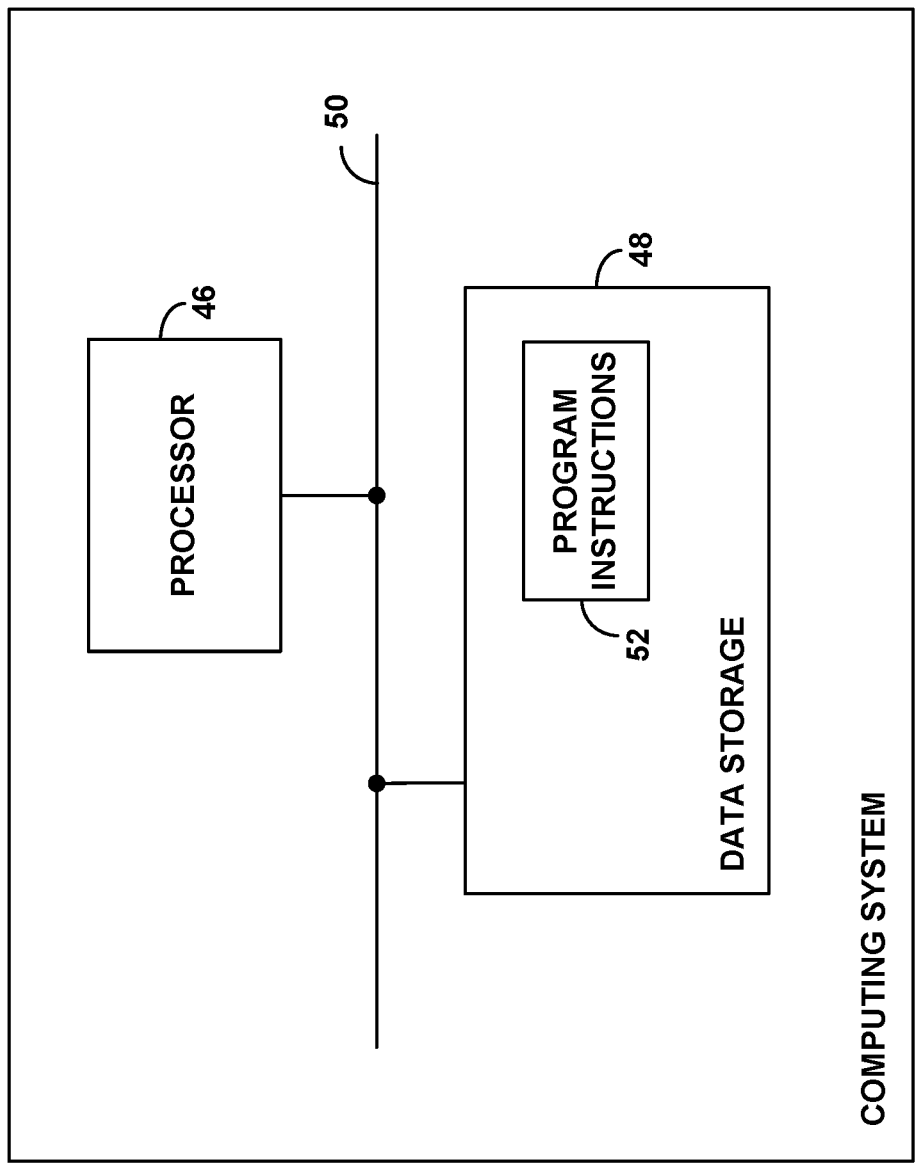

USE OF NOISE AS A BASIS TO CONTROL CONFIGURATION OF NARROWBAND CARRIER WITHIN WIDEBAND CARRIER

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which can facilitate mobile broadband service using technologies such as orthogonal frequency division multiplexing (OFDM) and multiple input multiple output (MIMO). And most recently, the industry has completed initial developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more radio frequency (RF) carriers, each of which could be frequency division duplex (FDD), defining separate frequency channels for downlink and uplink communication, or time division duplex (TDD), with a single frequency channel multiplexed over time between downlink and uplink use.

Each such frequency channel could be defined as a specific range of frequency having a bandwidth and a center frequency and thus extending from a low-end frequency to a high-end frequency. A representative RAT may support various such channel bandwidths. For example, 4G LTE supports carriers that have channel bandwidths of 1.4 MHz, 3 MHz, 5 MHz, 10 MHz, 15 MHz, and 20 MHz, among other possibilities, and 5G NR supports carriers having similar channel bandwidths as well as carriers having different and potentially much smaller or much wider channel bandwidths.

Further, on the downlink and uplink, the air interface on each carrier could be configured in a specific manner to define physical resources for carrying information (e.g., user-plane data and control-plane signaling) wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information. Further, in each subframe or other transmission time interval, the resource elements on the downlink and uplink of the example air interface could be grouped to define physical resource blocks (PRBs) that could be allocated as needed to carry data between the access node and served UEs.

In addition, certain resource elements on the example air interface could be designated for special use. For instance, on the downlink, certain resource elements could be set aside to define a downlink control region for carrying control signaling from the access node to UEs, certain resource elements could be designated to carry broadcast synchronization signals that UEs could detect as an indication of coverage on the carrier and to establish frame timing, and certain resource elements could be designated to carry a reference signal that UEs could measure to determine coverage strength, among other possibilities. And on the uplink, certain resource elements could be set aside to define an uplink control region for carrying control signaling from UEs to the access node, and certain resource elements could be designated to carry uplink reference signals or the like that could be used to evaluate uplink signal communications, among other possibilities.

Overview

A representative access node could be configured to provide service on one or more carriers such as those described above. To facilitate this, a wireless service provider that owns, operates, or controls the access node could acquire a license for radio frequency (RF) spectrum where appropriate and could configure the access node to operate on the carriers within that licensed spectrum. For instance, the service provider could configure the access node with one or more filters and/or other radio equipment to limit its communication to particular spectrum and could configure the access node to engage in downlink and uplink communication to define the carriers within that spectrum in accordance with an applicable radio access technology.

In practice, an access node that provides service on a given carrier could broadcast the synchronization signals noted above at the downlink center frequency of the carrier, and UEs could scan for and discover the broadcast synchronization signals as an indication that the access node provides service on the carrier centered at that frequency. Further, the access node could broadcast on the carrier a master information block (MIB) or the like that specifies the bandwidth of the carrier centered on that frequency. Thus, a UE that has discovered the synchronization signals could then read that MIB as way to determine the bandwidth of the carrier and thereby to determine the frequency range of the carrier as a range of frequency spectrum centered on the center frequency of the carrier and extending from a low-end frequency to a high-end frequency. The UE could then engage in signaling to connect with and be served by the access node on the carrier.

For various reasons, however, a wireless service provider may face a scenario where a access node will provide service on a carrier of particular bandwidth and where the service provider would also like to have the access node provide service on another carrier of a narrower bandwidth, but without the need to license or otherwise add more spectrum for use to define that other carrier.

For example, the service provider might configure an access node to provide service on a 20-MHz TDD carrier, and the service provider may also want to configure the access node to provide service on a 180-kHz TDD carrier, without the need to license or otherwise add 180-kHz of spectrum for use by the access node. This situation could arise, for instance, if the service provider would like to have the access node provide service on the narrower-bandwidth carrier for a special class of UEs, such as Class-M IoT (e.g., Machine-Type-Communication (MTC)) devices or narrowband IoT (nb-IoT) devices, without a need to add more spectrum to facilitate that service.

One way to address this scenario is to define the narrower-bandwidth carrier to be within the wider-bandwidth carrier's frequency range, with the wider-bandwidth carrier functioning as a host carrier and the narrower-bandwidth carrier functioning as a guest carrier. For instance, a access node could be configured to provide service on a 20-MHz carrier having a specific frequency range, and the access node could be additionally configured to provide service on a 180-kHz carrier whose frequency range sits somewhere within the frequency range of that 20-MHz carrier. Here, the wider-bandwidth carrier could be referred to as a wideband carrier and the narrower-bandwidth carrier could be referred to as a narrowband carrier.

With this arrangement, a portion of the wideband carrier's air-interface resources would also be air-interface resources of the narrowband carrier, but the access node could be configured to prioritize use of those resources for the narrowband carrier when needed or could otherwise manage those resources as between the two carriers.

In a representative implementation, the access node could specify in its MIB on the wideband carrier (i) the bandwidth of the wideband carrier and (ii) the center frequency and bandwidth of the narrowband carrier within the wideband carrier. When an IoT device or the like discovers coverage of the access node at the center frequency of the wideband carrier, the device could thus read the MIB and learn the location and bandwidth of the narrowband carrier and could then proceed to connect with the access node on that narrowband carrier. Whereas, when a conventional (e.g., non-IoT) device discovers coverage of the access node at the center frequency of the wideband carrier, the device could read the MIB and learn the bandwidth of the wideband carrier and could connect with the access node on that wideband carrier.

One technological question in such an arrangement is where in the frequency bandwidth of the wideband carrier the access node should define the narrowband carrier. For instance, in a scenario where the access node will define the narrowband carrier as spanning the frequency range of one or more PRBs of the wideband carrier, at issue could be which one or more PRBs of the wideband carrier the access node should define the narrowband carrier on.

The present disclosure provides a mechanism to help resolve this issue, by dynamically selecting a portion of the wideband carrier frequency on which to define the narrowband carrier, with the selecting being based on signal quality of the selected portion, such as based on the selected portion having a lowest level of noise among various candidate portions of the wideband carrier bandwidth.

In an example implementation, for instance, if the access node will define the narrowband carrier on a single PRB of the wideband carrier, the access node could dynamically select the PRB based at least on the PRB having a lowest level of noise (e.g., lowest reverse noise rise (RNR) on the uplink and/or highest signal-to-interference-plus-noise ratio (SINR) on the downlink) of the various PRBs of the wideband carrier. And based on having so selected the PRB, the access node could then define the narrowband carrier on that PRB of the wideband carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 4 is a simplified block diagram of an example computing system operable in an example implementation.

DETAILED DESCRIPTION

An example implementation will now be described in the context of a system that operates according to 4G LTE or 5G NR. However, it should be understood that the disclosed principles could extend to apply in other scenarios as well. Further, it should be understood that variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by a processing unit executing instructions stored in non-transitory data storage, along with associated circuitry or other hardware, among other possibilities.

Figure 1:
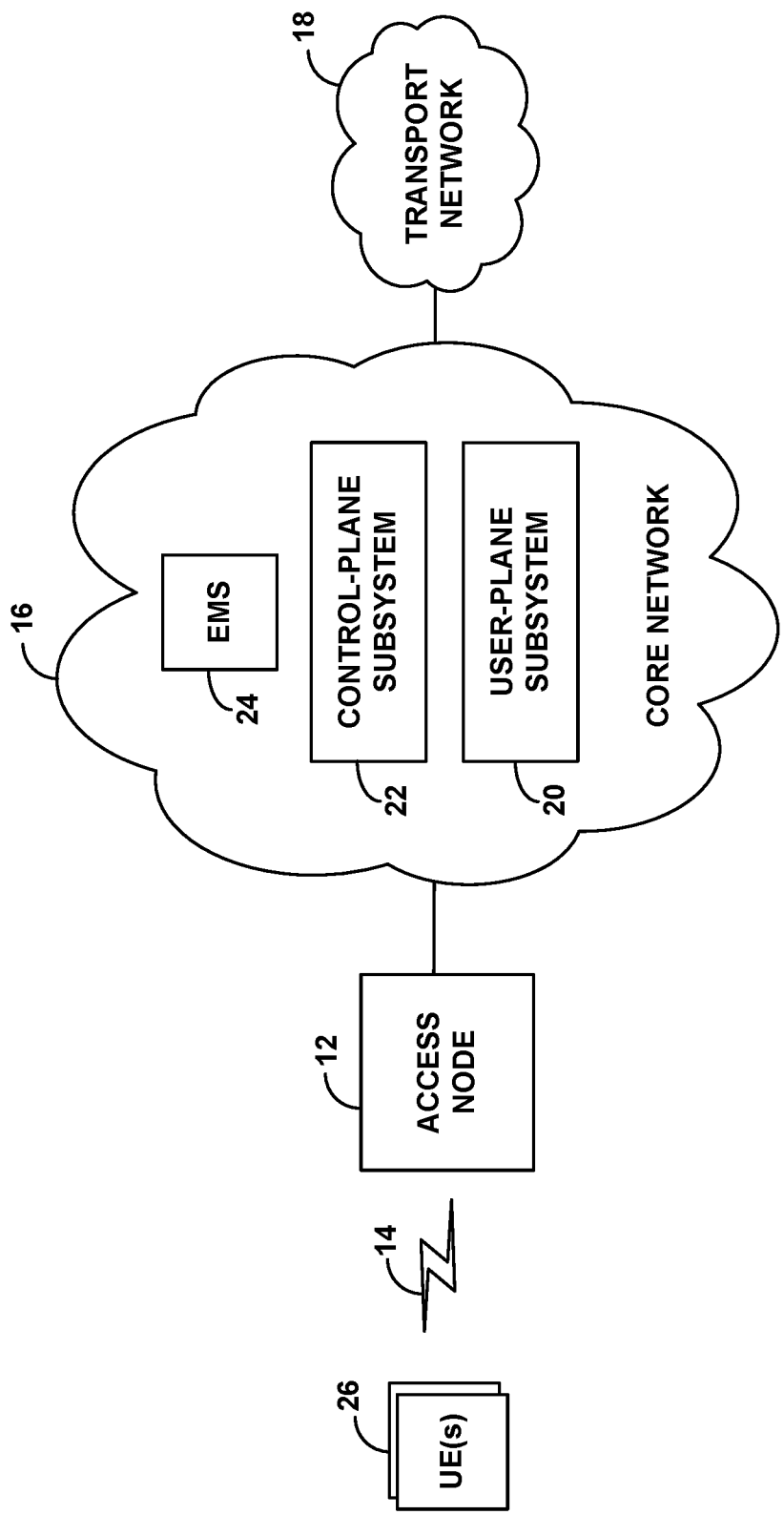
FIG. 1 is a simplified block diagram of an example network arrangement in which features of the present disclosure can be implemented.

FIG. 1 is a simplified block diagram of an example network arrangement having a cell site 12 that includes a representative access node 12, such as a 4G evolved Node-B (eNB) or a 5G next-generation Node-B (gNB). This access node could be a macro access node of the type configured to provide a wide range of coverage or could take other forms, such as a small cell access node, a repeater, a femtocell access node, or the like, possibly configured to provide a smaller range of coverage. Further, the access node could have a respective antenna structure configured to provide coverage in which to serve UEs.

As shown, the access node 12 could be configured to provide coverage and service on at least one carrier 14. This carrier could be FDD or TDD as discussed above, thus defining either separate downlink and uplink frequency channels or a common frequency channel multiplexed over time between downlink and uplink use. As noted above, each such frequency channel would have a center frequency and a bandwidth and would thus span a range of frequency extending from a low-end frequency to a high-end frequency. Without limitation, for instance, the carrier could be FDD, having a 20-MHz downlink channel spanning one range of frequency and a 20-MHz uplink channel spanning a separate range of frequency, or the carrier could be TDD, having a common 20-MHz channel multiplexed between downlink and uplink use.

In an example implementation, the air interface on carrier 14 could be configured as discussed above to define various air-interface resources for carrying communications between the access node and UEs. For instance, the air interface could be divided over time into frames, subframes, timeslots, and symbol time segments, and over frequency into subcarriers, thus defining the array of air-interface resource elements as noted above. Further, on a per-timeslot or per-subframe basis, for instance, the resource elements could be divided over the carrier bandwidth into groups defining the PRBs noted above. In an example implementation, for instance, each PRB could be 180-kHz wide, thus spanning a 180-kHz portion of the 20-MHz carrier bandwidth.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives from the access node to UEs. And other resource elements per subframe could be reserved to define a shared channel in which PRBs could carry scheduled data communications from the access node to UEs. Further, in certain subframes, a group of resource elements centered on the center frequency of the carrier could be reserved to carry synchronization signals as noted above. And, in certain subframes, a group of resource elements also centered on the center frequency of the carrier could be reserved to define a broadcast-channel for carrying system information messages, such as the MIB noted above as well as various system information block (SIB) messages. Further, certain resource elements distributed throughout the carrier bandwidth per subframe could be reserved to carry a cell-specific reference signal that UEs could measure as a basis to evaluate coverage strength and quality.

As further shown in FIG. 1, access node 12 could be interfaced with a core network 16 that provides connectivity with an external transport network 18 such as the Internet for instance. An example core network could be a packet-switched network (e.g., an Evolved Packet Core (EPC) network or a Next Generation Core (NGC) network) that supports virtual-packet tunnels or other interfaces between network nodes. As shown in FIG. 1, the core network 16 could include a user-plane subsystem 20 through which UE bearer communications could flow to and from the transport network 18, and a control-plane subsystem 22 supporting functions such as UE attachment, authentication, mobility management, and bearer management, among others. Further, the core network 16 could include an element management system (EMS) 24, which could be a computing-system platform configured to operate as a central repository of operational data for the wireless communication network and to control and manage operation of various network elements such as access node 12.

FIG. 1 also illustrates a number of example UEs 26 that may from time to time be within coverage of access node 12. Each such UE could be any of the types noted above, among other possibilities and could include one or more radios and associated logic that enables the UE to be served in accordance with a RAT on which access node 12 provides service.

When a UE enters into coverage of access node 12, the UE could scan for and detect coverage of the access node on carrier 14 by detecting broadcast of synchronization signals at a known center frequency of the carrier. Using frame timing established based on the timing of the synchronization signals, the UE could then read the broadcast MIB to determine the carrier bandwidth. And the UE could then evaluate strength of the broadcast reference signal throughout the carrier bandwidth. For instance, the UE could determine a reference signal receive power (RSRP) of the carrier.

If the UE determines that the RSRP is strong enough, the UE could then engage in a process to connect with the access node. For instance, the UE could engage in random-access signaling and connection signaling, such as Radio Resource Control (RRC) signaling, with the access node to establish an air-interface connection (e.g., RRC connection) through which the access node will then serve the UE on the carrier.

In addition, if the UE is not already registered for service with the core network 16, the UE could transmit to the access node an attach request, which the access node could forward to an entity of the control-plane subsystem 22 for processing. And that entity and the access node could then coordinate setup for the UE of one or more user-plane bearers, each of which could include (i) an access-bearer portion that extends through the user-plane subsystem 20 and (ii) a data-radio-bearer portion that extends over the air between the access node and the UE.

Once the UE is connected and registered, the access node could then serve the UE in a connected mode over the air-interface connection, managing downlink air-interface communication of packet data to the UE and uplink air-interface communication of packet data from the UE.

For instance, when the user-plane subsystem 20 receives data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network 18, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could accordingly transmit the transport block to the access node in the designated PRBs.

In practice, for present purposes or otherwise, the access node 12 could regularly determine and keep track of the level of noise on carrier 14, on a per-frequency basis across the bandwidth of the carrier, and perhaps separately for the downlink and the uplink. Without limitation, for instance, the access node could keep track of the level of noise on a per PRB basis, such as per 180-kHz segment of the carrier bandwidth respectively on the downlink and uplink of the carrier. Noise could encompass traditional noise (e.g., arising from human-made structures or nature) and interference (e.g., arising from human-made structures), among other possibilities.

On the downlink, the access node could determine the level of noise per downlink PRB by having served UEs measure and report to the access node a level of SINR of transmission (e.g., reference signal transmission or other transmission) from the access node per PRB on the carrier. For instance, the access node could transmit to each such served UE an RRC connection reconfiguration message that directs the UE to take and report such measurements, and the UEs could responsively take such measurements and transmit RRC messages to the access node providing the measurements. The access node could then effectively deem the level of noise per PRB to an inverse of such reported SINR for that PRB. And the access node could maintain in data storage a rolled up average or other statistical measures of this or other such noise per PRB, such as over a recent sliding window of time for instance.

And on the uplink, the access node could determine the level of noise per uplink PRB by itself measuring the level of noise per uplink PRB. For instance, the access node could measure the energy level above a baseline level on each PRB, as a representation of RNR or the like, among other possibilities. And the access node could likewise maintain in data storage a rolled up average or other statistical measure of this or other such noise per PRB, also perhaps over a recent sliding window of time.

The access node could also report this noise information to the EMS 24, and the EMS 24 could likewise store the noise information for reference and evaluation.

As noted above, the present disclosure seeks to address the question of where in the frequency bandwidth of a carrier such as carrier 14 the access node should define a narrowband carrier. For an FDD carrier, at issue could be where in the downlink channel of the FDD carrier to define the downlink channel of the narrowband carrier and separately where in the uplink channel of the FDD carrier to define the uplink channel of the narrowband carrier. And for a TDD carrier, at issue could be where in the TDD frequency channel to define the downlink and uplink of the narrowband carrier. Further, as noted above, this narrowband carrier could be for use by a special class of UEs such as Class-M IoT (e.g., MTC) devices or nb-IoT devices.

As indicated above, the access node could dynamically select a frequency segment of the bandwidth of carrier 14 (e.g., on the downlink and/or uplink) on which to define this narrowband carrier, with the dynamic selection being based on the selected frequency segment having the lowest level of noise compared with other frequency segments of the carrier bandwidth. For instance, if the access node is going to define the narrowband carrier as spanning a single PRB, the access node could review its stored records of noise per PRB across the carrier bandwidth to select the PRB having the lowest indicated level of noise. Or if the access node is going to define the narrowband carrier as spanning three largely contiguous PRBs, the access node could identify various candidate groups of three such PRBs within the carrier bandwidth, the access node could compute for each candidate group a representative measure of noise (e.g., average noise of the PRBs in the group, or maximum noise of the PRBs in the group), and the access node could select the group having the lowest such measure of noise among the candidate groups.

In practice, the access node may also consider one or more additional factors as its basis to select a frequency segment of the carrier bandwidth on which to define the narrowband carrier. For instance the access node may prefer selection of a frequency segment that is closer to the center of the carrier bandwidth and/or farther away from an edge of an applicable passband, to help reduce likelihood of insertion loss or other impact on the quality of communication on the selected frequency segment.

In an alternative implementation, a computing system such as the EMS 24 could be carry out or assist with the selecting of the frequency segment on which the access node 12 should define the narrowband carrier. For instance, the EMS 24 could refer to noise data reported by the access node, to select a frequency segment of the carrier bandwidth that has the lowest level of noise and could then signal to the access node to inform the access node of this selection.

Given the selection of the frequency segment of the carrier bandwidth on which to define the narrowband carrier, perhaps separate frequency segments respectively for uplink and downlink, or a single frequency segment for both uplink and downlink, the access node could then establish the narrowband carrier. For instance, the access node could add to the MIB broadcast on carrier 14 a specification of the center frequency and bandwidth of the narrowband carrier, which would be the selected frequency segment. Further, the access node could define and operate on various control and shared channels in the narrowband carrier, in accordance with any agreed protocol for instance. As noted above, UEs could then discover presence of the narrowband carrier and could connect with the access node on the narrowband carrier.

Further, the access node could repeat this process periodically or in response to one or more other triggers. As levels of noise vary per frequency segment, each iteration of this process may result in the access node selecting a different frequency segment of the carrier bandwidth on which to define the narrowband carrier, so the access node may re-define the narrowband carrier, e.g., by changing MIB information and so forth. Of course, the access node could also take precautions to help ensure that redefining the location of the narrowband carrier in the bandwidth of the wideband carrier would not interfere with current service that the access node is providing on the narrowband carrier.

Note also that, while this process has been described in terms of configuring one narrowband carrier within the frequency bandwidth of the wideband carrier, that process does not exclude the possibility of also configuring one or more additional narrowband carriers within the frequency bandwidth of the wideband carrier. For instance, the process could additionally include the access node configuring a second narrowband carrier on a frequency segment deemed to have the second lowest level of noise, among other possibilities.

Figure 2:
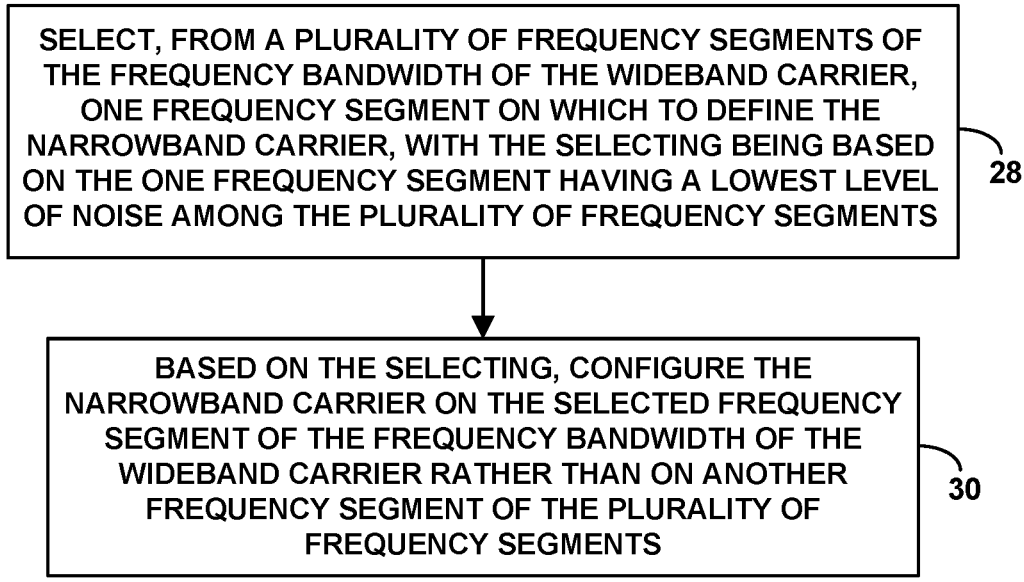
FIG. 2 is a flow chart depicting a method that can be carried out in accordance with the disclosure.

FIG. 2 is a flow chart depicting an example method that could be carried out in accordance with the present disclosure, to control configuration of a narrowband carrier within frequency bandwidth of a wideband carrier. As shown in FIG. 2, at block 28, the method includes selecting, from a plurality of frequency segments of the frequency bandwidth of the wideband carrier, one frequency segment on which to define the narrowband carrier, with the selecting being based on the one frequency segment having a lowest level of noise among the plurality of frequency segments. And a block 30, the method includes, based on the selecting, configuring the narrowband carrier on the selected frequency segment of the frequency bandwidth of the wideband carrier rather than on another frequency segment of the plurality of frequency segments.

In line with the discussion above, the frequency bandwidth of the wideband carrier could comprise a frequency bandwidth of a downlink channel of the wideband carrier, the level of noise could comprise a level of downlink noise, and the act of selecting the one frequency segment on which to define the narrowband carrier could comprise selecting the one frequency segment on which to define a downlink channel of the narrowband carrier.

Further, the method could additionally include determining a level of downlink noise respectively on each frequency segment of the plurality of frequency segments, and determining that the one frequency segment has the lowest level of downlink noise among the plurality of frequency segments. As discussed above, for instance, determining the level of downlink noise per frequency segment could be based on SINR reporting from one or more devices served on the wideband carrier.

Also in line with the discussion above, the frequency bandwidth of the wideband carrier could comprise a frequency bandwidth of an uplink channel of the wideband carrier, the level of noise could comprise a level of uplink noise, and the act of selecting the frequency segment of the frequency bandwidth on which to define the narrowband carrier could comprise selecting the frequency segment for use to define an uplink channel of the narrowband carrier.

Further, the method could then additionally include determining a level of uplink noise respectively on each frequency segment of the plurality of frequency segments, and determining that the one frequency segment has the lowest level of uplink noise among the plurality of frequency segments. And as discussed above, for instance, determining the level of uplink noise per frequency segment could be based on RNR measured by an access node that operates on the wideband carrier.

As further discussed above, the act of configuring narrowband carrier on the selected frequency segment of the frequency bandwidth of the wideband carrier could involve broadcasting a control message indicating presence of the narrowband carrier defined on the selected frequency segment, possibly among other operations.

And as discussed above, the method could be carried out by an access node that provides service on the wideband carrier, in which case the access node could then provide service on the narrowband carrier as well.

And still further, as discussed above, each frequency segment in an example implementation could be defined based on frequency width of one or more PRBs, among other possibilities.

Figure 3:
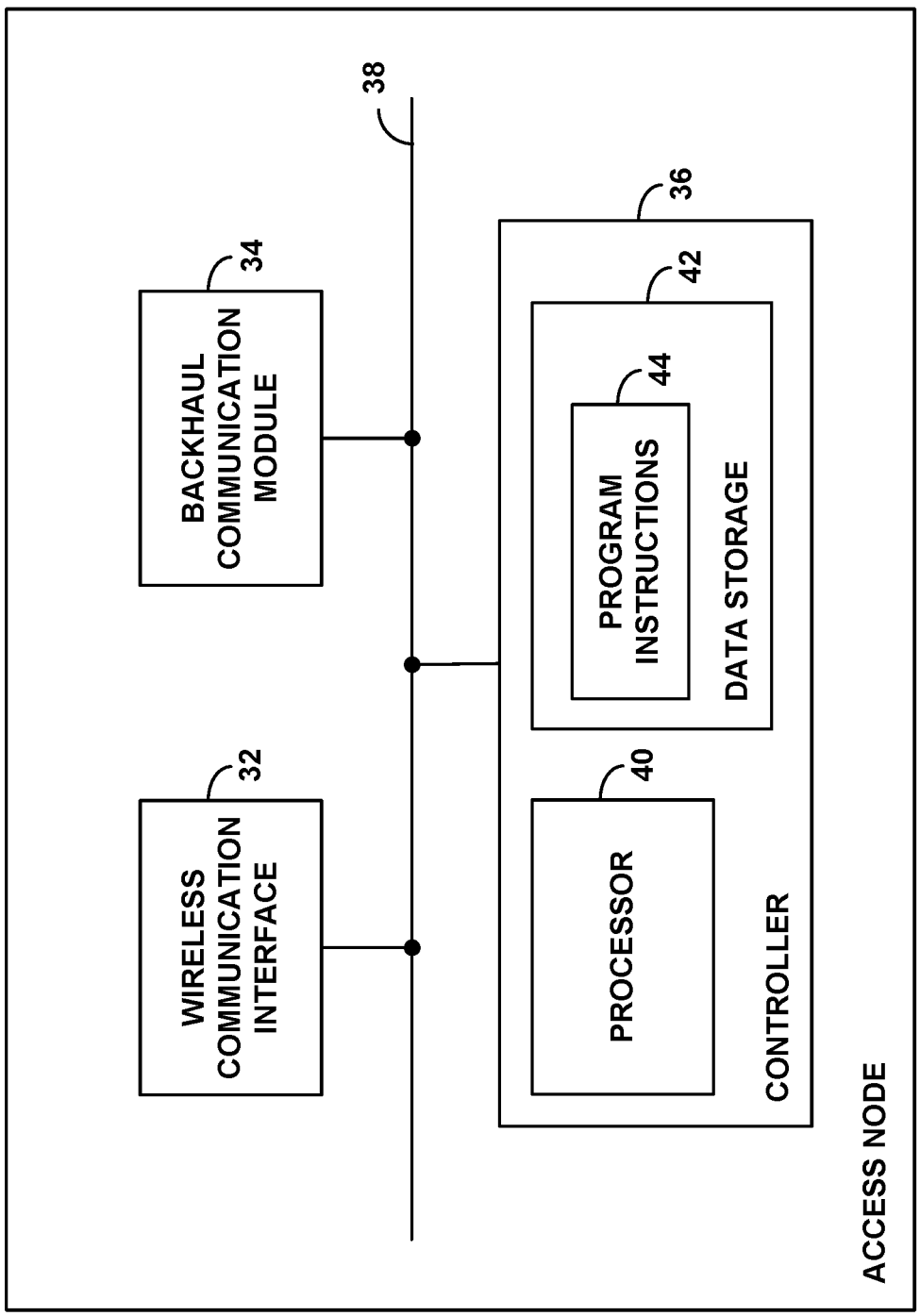
FIG. 3 is a simplified block diagram of an example access node operable in an example implementation.

FIG. 3 is next a simplified block diagram of an example access node that could be configured to carry out various features described herein. As shown in FIG. 3, the example access node includes a wireless communication interface 32, a backhaul communication interface 34, and a controller 36, all of which could be integrated together and/or communicatively linked together by a system bus, network, or other connection mechanism 38.

In an example implementation, the wireless communication interface 32 could support air-interface communication on a wideband carrier having a frequency bandwidth that defines a plurality of frequency segments, and the wireless communication interface may therefore comprise an antenna structure, which could be tower mounted or could take other forms, and associated components such as a power amplifier and a wireless transceiver, so as to enable the access node to serve UEs on such a carrier. And the backhaul communication interface 34 could comprise a wired or wireless communication module, such as an Ethernet network communication module and associated logic, through which the access node could engage in backhaul communication with various other network entities.

Further, the controller 36 could be configured to carry out various operations described herein, to control configuration of a narrowband carrier within the frequency bandwidth of the wideband carrier.

For instance, as shown, the controller 36 could include at least one processor 40, such as one or more general purpose processors (e.g., microprocessors) and/or one or more specialized processors, and a non-transitory data storage 42 (e.g., one or more volatile and/or non-volatile storage components (e.g., magnetic, optical, or flash storage, necessarily non-transitory)) storing program instructions 44 executable by the at least one processor 40 to carry out those operations (e.g., to cause the access node to carry out the operations).

And in line with the discussion above, the operations could include (i) selecting one of the frequency segments of the frequency bandwidth of the wideband carrier on which to define the narrowband carrier, with the selecting being based on the one frequency segment having a lowest level of noise among the plurality of frequency segments, and (ii) based on the selecting, configuring the narrowband carrier on the selected frequency segment of the frequency bandwidth of the wideband carrier rather than on another frequency segment of the plurality of frequency segments.

Various other features described herein can be implemented in this context as well, and vice versa.

FIG. 4 is next a simplified block diagram of an example computing system that could carry out various features as described above. In the example arrangement discussed above, this computing system could be provided at various entities, such as access node 12 or EMS 24, among other possibilities. As shown in FIG. 4, the computing system includes at least one processor 46 and at least one non-transitory data storage 48, which could be integrated or communicatively linked together by a system bus, network, or other connection mechanism 50.

The at least one processor 46 could comprise one or more general purpose processors and/or one or more specialized processors. And the at least one non-transitory data storage 48 could comprise one or more volatile and/or non-volatile storage components, such as magnetic, optical, or flash storage media (necessarily non-transitory). And as further shown, the at least one non-transitory data storage 48 storing program instructions 52. In a representative implementation, those program instructions 52 could be executable by the at least one processor 46 to carry out various features described herein.

Various other features discussed herein can be implemented in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

I claim:

1. A method to control configuration of a narrowband carrier within frequency bandwidth of a wideband carrier, wherein the frequency bandwidth of the wideband carrier defines a plurality of frequency segments, the method comprising:
sending, to one or more devices, a radio resource control (RRC) connection reconfiguration message that includes an instruction to perform measurements on the plurality of frequency segments;
receiving at least one measurement report from the one or more devices;
determining, based at least in part on the at least one measurement report, a level of downlink noise respectively on each frequency segment of the plurality of frequency segments;
determining that one frequency segment has a lowest level of downlink noise among the plurality of frequency segments;
selecting the one frequency segment of the frequency bandwidth of the wideband carrier on which to define the narrowband carrier, wherein the selecting is based on determining that the one frequency segment has the lowest level of noise among the plurality of frequency segments, and
based on the selecting, configuring the narrowband carrier on the one frequency segment of the frequency bandwidth of the wideband carrier rather than on another frequency segment of the plurality of frequency segments.

2. The method of claim 1, wherein the frequency bandwidth of the wideband carrier comprises a frequency bandwidth of a downlink channel of the wideband carrier, wherein the level of noise comprises a level of downlink noise, and wherein selecting the one frequency segment on which to define the narrowband carrier comprises selecting the one frequency segment on which to define a downlink channel of the narrowband carrier.

3. The method of claim 2, wherein determining the level of downlink noise per frequency segment is based on signal-to-interference-plus-noise-ratio (SINR) reporting from one or more devices served on the wideband carrier.

4. The method of claim 1, wherein the frequency bandwidth of the wideband carrier comprises a frequency bandwidth of an uplink channel of the wideband carrier, wherein the level of noise comprises a level of uplink noise, and wherein selecting the frequency segment of the frequency bandwidth on which to define the narrowband carrier comprises selecting the frequency segment for use to define an uplink channel of the narrowband carrier.

5. The method of claim 4, further comprising determining a level of uplink noise respectively on each frequency segment of the plurality of frequency segments, and determining that the one frequency segment has the lowest level of uplink noise among the plurality of frequency segments.

6. The method of claim 5, wherein determining the level of uplink noise per frequency segment is based on reverse noise rise (RNR) measured by an access node that operates on the wideband carrier.

7. The method of claim 1, wherein configuring narrowband carrier on the selected frequency segment of the frequency bandwidth of the wideband carrier comprises broadcasting a control message indicating presence of the narrowband carrier defined on the selected frequency segment.

8. The method of claim 1, wherein the method is carried out by an access node that provides service on the wideband carrier, the access node then providing service on the narrowband carrier as well.

9. The method of claim 1, wherein each frequency segment is defined based on frequency width of one or more physical resource blocks.

10. The method of claim 1, wherein selecting the one frequency segment includes defining the narrowband carrier as spanning a single physical resource block (PRB).

11. An access node comprising:
a wireless communication interface supporting air-interface communication on a wideband carrier, wherein the wideband carrier has a frequency bandwidth defining a plurality of frequency segments;
a backhaul communication interface; and
a controller configured to carry out operations to control configuration of a narrowband carrier within the frequency bandwidth of the wideband carrier, the operations including:
sending, to one or more devices, a radio resource control (RRC) connection reconfiguration message that includes an instruction to perform measurements on the plurality of frequency segments;
receiving at least one measurement report from the one or more devices;
determining, based at least in part on the at least one measurement report, a level of downlink noise respectively on each frequency segment of the plurality of frequency segments;
determining that one frequency segment has a lowest level of downlink noise among the plurality of frequency segments;
selecting the one frequency segment of the frequency bandwidth of the wideband carrier on which to define the narrowband carrier, wherein the selecting is based on determining that the one frequency segment has the lowest level of noise among the plurality of frequency segments, and
based on the selecting, configuring the narrowband carrier on the one frequency segment of the frequency bandwidth of the wideband carrier rather than on another frequency segment of the plurality of frequency segments.

12. The access node of claim 11, wherein the controller comprises at least one processor, non-transitory data storage, and program instructions stored in the non-transitory data storage and executable by the at least one processor to carry out the operations.

13. The access node of claim 11,
wherein the frequency bandwidth of the wideband carrier comprises a frequency bandwidth of a downlink channel of the wideband carrier, wherein the level of noise comprises a level of downlink noise, and wherein selecting the one frequency segment on which to define the narrowband carrier comprises selecting the one frequency segment on which to define a downlink channel of the narrowband carrier.

14. The access node of claim 11,
wherein the frequency bandwidth of the wideband carrier comprises a frequency bandwidth of an uplink channel of the wideband carrier, wherein the level of noise comprises a level of uplink noise, and wherein selecting the frequency segment of the frequency bandwidth on which to define the narrowband carrier comprises selecting the frequency segment for use to define an uplink channel of the narrowband carrier.

15. The access node of claim 11, wherein configuring narrowband carrier on the selected frequency segment of the frequency bandwidth of the wideband carrier comprises causing the access node to broadcast a control message indicating presence of the narrowband carrier defined on the selected frequency segment.

16. The access node of claim 11, wherein each frequency segment is defined based on frequency width of one or more physical resource blocks.

17. A computing system for controlling configuration of a narrowband carrier within frequency bandwidth of a wideband carrier, wherein the frequency bandwidth of the wideband carrier defines a plurality of frequency segments, the computing system comprising:
- at least one processor;
- at least one non-transitory data storage; and
- program instructions stored in the at least one non-transitory data storage and executable by the at least one processor to carry out operations including:
  - sending, to one or more devices, a radio resource control (RRC) connection reconfiguration message that includes an instruction to perform measurements on the plurality of frequency segments;
  - receiving at least one measurement report from the one or more devices;
  - determining, based at least in part on the at least one measurement report, a level of downlink noise respectively on each frequency segment of the plurality of frequency segments;
  - determining that one frequency segment has a lowest level of downlink noise among the plurality of frequency segments;
  - selecting the one frequency segment of the frequency bandwidth of the wideband carrier on which to define the narrowband carrier, wherein the selecting is based on determining that the one frequency segment has the lowest level of noise among the plurality of frequency segments, and
  - based on the selecting, configuring the narrowband carrier on the one frequency segment of the frequency bandwidth of the wideband carrier rather than on another frequency segment of the plurality of frequency segments.

18. The computing system of claim 17, wherein the frequency bandwidth of the wideband carrier comprises a frequency bandwidth of a downlink channel of the wideband carrier, wherein the level of noise comprises a level of downlink noise, and wherein selecting the one frequency segment on which to define the narrowband carrier comprises selecting the one frequency segment on which to define a downlink channel of the narrowband carrier.

19. The computing system of claim 17, wherein the frequency bandwidth of the wideband carrier comprises a frequency bandwidth of an uplink channel of the wideband carrier, wherein the level of noise comprises a level of uplink noise, and wherein selecting the frequency segment of the frequency bandwidth on which to define the narrowband carrier comprises selecting the frequency segment for use to define an uplink channel of the narrowband carrier.

20. The computing system of claim 17, wherein each frequency segment is defined based on frequency width of one or more physical resource blocks.

* * * * *